United States Patent Office 3,560,098
Patented Feb. 2, 1971

3,560,098
DOUBLE-BEAM PHOTOMETER INCLUDING STRUCTURE TO ELIMINATE RE-RADIATION FROM THE OUTPUT SIGNALS
Wolfgang Witte and Joachim Marckmann, Uberlingen (Bodensee), Germany, assignors to Bodenseewerk Perkin-Elmer & Co. GmbH, Uberlingen (Bodensee), Germany
Filed Apr. 30, 1969, Ser. No. 820,540
Claims priority, application Germany, May 8, 1968, P 17 72 389.6
Int. Cl. G01j 1/36; G01n 21/22
U.S. Cl. 356—205                                10 Claims

ABSTRACT OF THE DISCLOSURE

A double-beam photometric system (e.g., a spectrophotometer) causes the radiation from the source to pass through the (first) sample path during a first quarter-period to the detector, so that the detector receives sample-transmitted radiation, P, plus "characteristic" radiation generated by the elements in the sample path, $P_0$. During the second quarter-period the radiation is blocked from the sample path, while the detector "sees" this same path, thereby obtaining only the "characteristic" sample path radiation, $P_0$. During the third quarter-period both the source radiation and the path to the detector are switched to the second reference path, so that the detector "sees" reference transmitted source energy, V, plus re-radiation from the reference path elements, $V_0$. In the final quarter-period the source radiation is blocked from the reference path, so that the detector sees only the reference path re-radiation, $V_0$. Thus the four quarter-period signals are: $P+P_0$, $P_0$, $V+V_0$, and $V_0$. By synchronously demodulating the detector signal so as to invert the second and third quarter-periods together relative to the first and fourth, the four signals become: $+P+P_0$, $-P_0$, $-V-V_0$, and $+V_0$. Thus the D.C. sum of the signals is $P-V$, free of all re-radiation components, which signal may therefore be utilized in a conventional servo-system to drive a reference beam attenuator so as to cause a nulling of the difference between P and the attenuated V signal. This system is relatively insensitive to errors in phase synchronization of the optical switching means (e.g., rotating sector choppers) and the electrical demodulator.

The present invention relates to double-beam photometric measuring instruments, for example, double-beam spectrophotometers. In particular, a double-beam photometric instrument according to the invention includes: a radiation source; a beam-splitting device, whereby a beam of rays originating from said radiation source is directed in a cyclic sequence into alternate first and second paths of rays; a beam-uniting device, whereby the radiation from the first and from the second path of rays is alternatingly directed in cyclic sequence into a common path of rays onto a single radiation detector in a manner such that during two quarter periods only the "characteristic" (background) radiation from the first and second paths of rays, respectively, and during two further quarter periods the radiation from the light source in addition to the "characteristic" radiation from the first and second paths of rays, respectively, is admitted into the common path of rays, and further including a phase-sensitive demodulator for the electrical signal generated by the radiation detector. In this context, the "characteristic" radiation is considered the radiation which does not originate from the light source, but is emitted by the sample and the optical elements in the path of rays itself.

Radiation on the type indicated (i.e., "characteristic") often occurs in the form of infra-red radiation in infra-red spectrophotometers. However, by way of example, long duration phosphorescence of the sample in an ultra-violet spectrophotometer may also be involved. This characteristic radiation may lead to a falsification of the measurement. The problem arises both if a quotient of the signals originating from the first and from the second path of rays is formed electrically (i.e., a ratio recording instrument), and also if an optical nulling device (i.e., attenuator) is controlled (e.g., by a servo system) by the signals of the radiation detector.

It is a primary aim of the invention to eliminate the influence of this characteristic radiation on the measurement.

Various arrangements of the type indicated are known or have been proposed. An arrangement according to Savitzky and Halford ("Review of Scientific Instruments," March 1950) operates with a divided aperture. Each respective half of the pupil is associated with the sample beam of rays and with the reference beam of rays, respectively. Both beams of rays are interrupted at the same frequency, but in phase-shifted relationship by a quarter period. The signals corresponding to the sample and to the reference material, impinge upon the detector in 90° phase-shifted relationship. With a system of the type indicated essentially only one signal having a single frequency occurs, and the wanted (sample to reference) ratio $S/R$ is dependent on the phase of this signal and is formed electrically. A system of the type indicated having one single frequency has a number of advantages, particularly for infrared spectrophotometers where the generally used detectors sensitive over a wide wavelength range, have only a rather limited (time) frequency response.

On the other hand, such a system suffers from the shortcoming that the two beams, that is the ones passing through sample and reference materials, have to follow separate paths through the optical system of the spectrophotometer, for instance, during their passage through the monochromator. This causes considerable problems in accurate alignment and the like of the two beams at all wavelengths at which the spectrophotometer is used. Additionally, an arrangement has been proposed wherein the intensity ratio is formed electrically, in which a beam originating from a radation source is alternatingly directed into one or the other path of rays by a beam-splitting device. There is provided a beam-uniting device whereby the beam is directed at full aperture (area) along a common ray path onto a radiation detector. The beam-splitting device and the beam-uniting means are arranged and cooperate such that in operation the output signal of the detector has two components phase-shifted by a quarter period with respect to each other, each representative of the sample and reference beams of rays, respectively. Thereby, the ratio of the two components can be formed while the beams use the full aperture; and the "characteristic" radiation in the sample and reference paths of rays is effectively suppressed. With the already proposed arrangement, this is accomplished in a manner such that the beam-uniting device effects twice the beam alternations as the beam-splitting device.

In this existing system, the radiation impinges upon the radiation detector in a cyclically repeated sequence of four equal intervals of time (quarter periods). In the first quarter period, the radiation detector receives radiation from the radiation source via the first path of rays. In the second quarter period the radiation detector receives radiation from the radiation source via the second path of rays. In the third and fourth quarter periods the radiation detector finally receives only "characteristic" radiation from the first and second paths of rays, respectively (i.e., no radiation from the light source). The detector signal is rectified phase-sensitively by two demodulators operating in phase-shifted relation by a quarter period. The direct current components thus obtained, which are proportional to the radiation passing from the light source to the detector, wihout (i.e., compensated for) characteristic radiation of the sample, are supplied to a quotient-forming device.

Such prior arrangements are quite sensitive with respect to phase difference between signal and demodulator.

As compared therewith, it is the object of the present invention to provide an arrangement wherein on the one hand there is effected a suppression of the "characteristic" radiation, and on the other hand an "optical nulling" takes place by using the conventional nulling control means (e.g., a variable optical beam attenuator and a closed loop servo system).

It is a more specific object of the present invention to provide an arrangement which supplies an output signal in response to the difference of the beam intensities, without (i.e., compensated for) characteristic radiation.

It is a further more specific object of the present invention, when eliminating the characteristic radiation, to utilize a signal-evaluating circuit as simple as possible, having one channel only and not exacting much of the linearity of the amplifier.

Finally, it is an object of the present invention to render an arrangement of the type indicated, substantially insensitive with respect to the phase adjustment.

The invention resides in the fact that the beam-splitting and beam-uniting (or recombining) devices act to direct, in cyclic sequence successively in two adjacent quarter-periods of the first half-period the total radiation from the first path of rays, and then the "characteristic" radiation from the first path of rays; and in the remaining two adjacent quarter-periods (i.e., the second half-period) first, the total radiation from the second path of rays, and then the characteristic radiation from the second path of rays into the common path of rays; and that a phase-sensitive demodulator effects a signal inversion (for a half-period) after the first and before the last of the four quarter-periods of the cycle, so that the direct current component of the demodulator output is indicative of the difference of the radiation components originating from the light source (and impinging upon the detector) transmitted by the first and second paths of rays; and that optical nulling means are controllable (in a manner known per se) by said output signal.

The invention will be hereinafter more fully described by means of one embodiment with reference to the accompanying drawings, in which.

Figure 1:
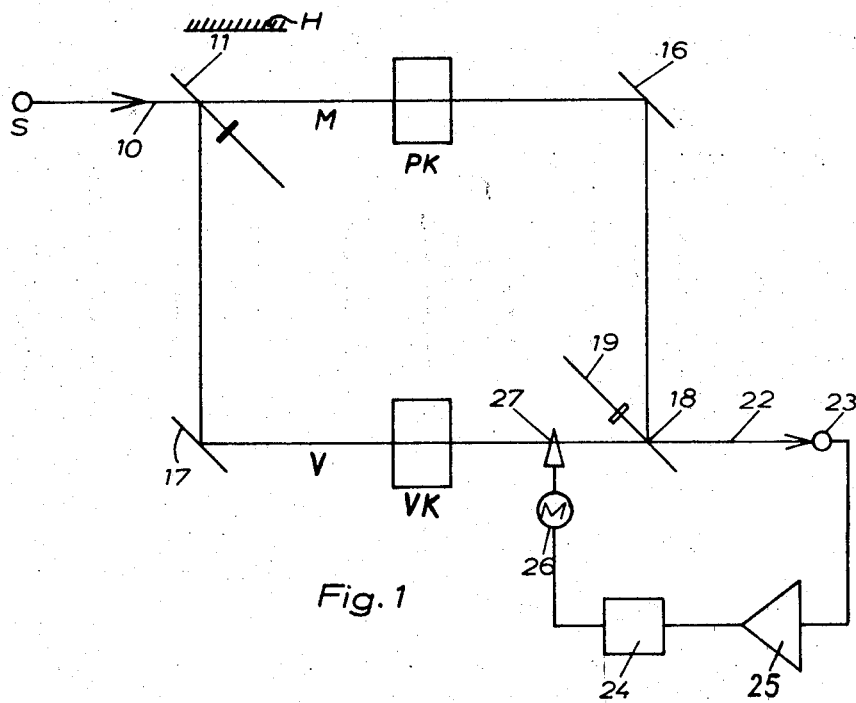
FIG. 1 illustrates schematically the optical arrangement of the parts.
Figure 4:
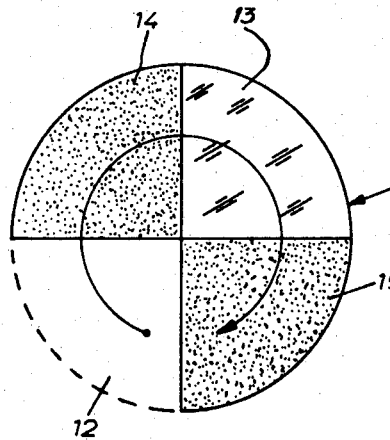
FIG. 4 shows the sector mirror comprising one form of the beam-splitting device.

In FIG. 1, a light beam originates from a light source S. The light beam 10 impinges upon the rotating sector mirror 11, the plane of which is inclined at 45° to the beam axis. The sector mirror 11 acts as the beam-splitting device, and a frontal view thereof is shown in FIG. 4. It comprises four quadrants, and that is one transmitting quadrant 12 as well as a reflecting quadrant 13 disposed diametrically oppositely each other. Between the quadrants 12 and 13 there are provided two blackened (i.e., opaque and absorbing) quadrants 14 and 15.

Figure 5:
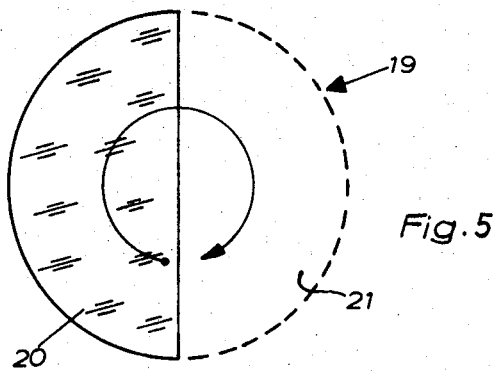
FIG. 5 shows the sector mirror forming the beam-uniting device.

When the transmitting quadrant 12 intercepts the beam of rays 10, it will be allowed to pass to the first path of rays (measuring path of rays M). Then, the beam traverses the sample cell PK and will be deflected by a mirror 16 by 90°. When the reflecting mirror 13 is in the beam of rays 10, it will be deflected by the sector mirror 11 and caused to pass into a second path of rays (comparison path of rays V) via a deflecting mirror 17 and through the comparison or reference cell VK. The two paths of rays, measuring path of rays, M, and comparison path of rays V intersect at point 18. At this point 18 a rotating sector mirror 19 intercepts both paths of rays, rotating sector 19 having its plane along the angle bisector of the beam axes. The sector mirror 19 forms the beam-combining device, and a frontal view thereof is shown in FIG. 5. It is reflecting on one half 20, and the other half 21 is transmitting. When the reflecting side 20 enters into the paths of rays, the measuring beam of rays M will be reflected into the common path of rays 22 and, after possible traversal of further optical elements, such as a monochromator (not shown), will impinge upon a radiation detector 23. When, however, the transmitting half 21 of the sector mirror 19 is present at the intersection point 18 of the two paths of rays, then the detector 23 will be impinged upon by the radiation from the comparison or reference path of rays (V). The radiation detector 23 supplies a signal to an amplifier 25, the output of which is demodulated by a phase-sensitive demodulator 24, the output of which adjusts optical nulling means 27, for instance, in the form of a comb-type shutter or attenuator in the reference path of rays, by means of a servomotor 26.

Figure 2:
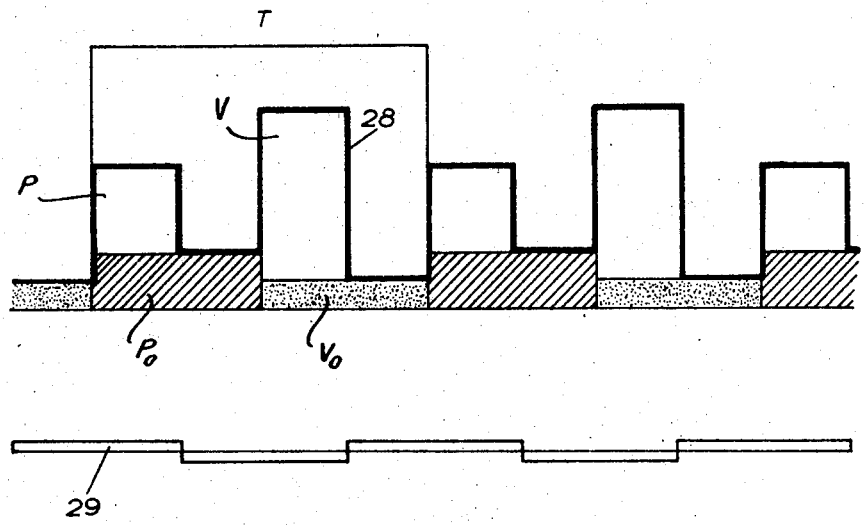
FIG. 2 shows the detector signal wave form, and illustrates timing of the phase-sensitive demodulation.
Figure 3:
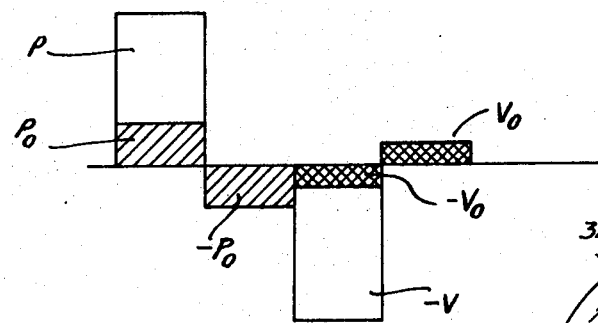
FIG. 3 shows the demodulated signal.

The operation of the arrangement so far described is most easily explained by means of the waveforms FIGS. 2 and 3.

At the beginning of one complete period T, that is, during the first quarter period, the transmitting quadrant 12 of the sector disk 11 is in the path of the beam of rays 10. Thus, the beam 10 passes along the measuring path of rays M and is reflected onto the radiation detector 23 by the reflecting portion 20 of the sector mirror 19. Thus, the radiation detector 23 obtains the sample radiation P from the light source S which passes along the measuring path of rays M through the sample cell PK onto the detector 23, plus the characteristic radiation $P_0$ which is emitted by the sample PK and other optical elements arranged in the measuring path of rays M (compare FIG. 2).

The two sector disks 11 and 19 rotate at the same relative speed through the beams. The sequence of the signals may, however, be followed more easily by assuming that the beams move relative to the sector mirrors in circular curves, as shown in FIGS. 4 and 5, which is equivalent, except that the frame of reference has been changed. Thus, if the two sectors (11 and 19) actually rotate counterclockwise as seen in FIGS. 4 and 5 through stationary (in space) beams, we may equivalently consider the sectors as stationary (i.e., take as our frame of reference the rotating sectors themselves), so as to cause the beams to appear to be revolving about the sector axes in a (same speed) clockwise direction as indicated in FIGS. 4 and 5 by the circular arrows.

Accordingly, the beam 10 subsequently impinges upon the blackened quadrant 14 of the sector disk 11 during the second quarter-period and will therefore be absorbed. No radiation from the light source S is therefore allowed to pass to the radiation detector 23. However, the (upper part in FIG. 5 of the) reflecting half 20 of the sector mirror 19 is still present in the path of rays M at point 18, so that some radiation from this path of rays M (this time, however, only the characteristic radiation $P_0$), is still allowed to pass to the detector 23, as is shown during the second quarter period of the whole period T in FIG. 2.

In the third quarter-period, the light beam 10 impinges upon the reflecting quadrant 13 and will be directed along the comparson path of rays V. Meanwhile, the transmitting half 21 of the sector mirror 10 has passed into the paths of rays (at point 18), so that the beam from the light source S passes through the comparison path of rays V onto the detector 23. Thus, the detector 23 obtains this radiation V, plus the "characteristic" radiation $V_0$ from the comparison or reference path.

In the fourth quarter-period, however, the beam 10 impinges upon the blackened (i.e., opaque and absorbing) sector 15 of the sector mirror 11 and is therefore absorbed. Since part of the transmitting half 21 of the sector mirror 19 is still effective (at point 18), only the characteristic radiation $V_0$ from the reference or comparison path of rays is allowed to pass onto the radiation detector 23.

Thereafter, the cycle will be repeated, thereby obtaining the waveform shown in heavy line at the upper half of FIG. 2.

The signal after amplification at 25 obtained is demodulated by means of the phase-sensitive demodulator 24 in such a manner that each time after the first quarter-period and after the third quarter-period there will be a signal inversion. In FIG. 2 the detector signal is illustrated by tthe heavy curve 28, while the timing and inverting effect of the demodulator is symbolized by the curve 29 near the bottom of FIG. 2. At the output of the demodulator the signal waveform illustrated in FIG. 3 is obtained. It can be seen, that the direct current component of this signal is proportional to $P-V$ and independent of $P_0$ and $V_0$, since the components $(P_0-P_0)$ and $(V_0-V_0)$ will cancel. By a conventional servo system including motor 26 and the nulling means 27 this direct current component $P-V$ is driven to zero, the position of the optical attenuator or other nulling means 27 being indicative of the intensity ratio $P/V$, independently of the sample characteristic radiation $P_0$ and $V_0$. It may be noted that the attenuator 27 does not affect the value of P or $P_0$ (or $-P_0$) in any way. It of course attenuates not only V (to, say, $V/k$) but also the $V_0$ in both quarter-periods of FIG. 2 equally (e.g., $V_0/k$). Therefore, the last two quarter-periods of the FIG. 3 signal contain equally attenuated ($V_0/k$ and $-V_0/k$) "characteristic" radiation signals, which therefore are always compensated or cancelled as before, regardless of the attenuation factor, $k$.

The invention may be modified in various manners.

Figure 6:
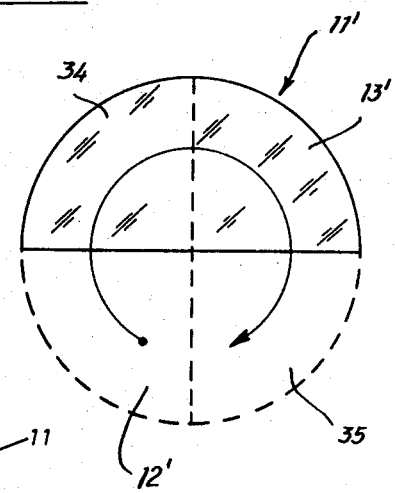
FIG. 6 shows an alternate form of the sector mirror comprising a modification of the beam-splitting device.

Thus, for example, the quadrant 14 of the beam-splitting sector disk 11 in FIG. 4 could also be made reflecting, and the quadrant 15 made transmitting. Such a modified form of the beam-splitter is shown in FIG. 6 at 11', wherein transmitting quadrant 12' reflecting quadrant 13' correspond directly to the similarly referenced (unprimed) quadrants of the FIG. 4 beam-splitter 11. However, the quadrant 34 of FIG. 6 (corresponding in position to absorbing quadrant 14 of FIG. 4) is now reflecting, and quadrant 35 (corresponding in position to absorbing quadrant 15 of FIG. 4) is now transmitting. Thus, the modified beam-splitting device 11' of FIG. 6 actually comprises a transparent (e.g., open) semi-circular sector 12', 35 and a reflecting semi-circular sector 34, 13', thereby being similar in structure but at a 90° (one quarter-period) phase difference in position to the beam-uniting device 19 of FIG. 5, with which it may be used without modification. Although in this case the beam 10 would be reflected into the comparison path of rays (V) during the second quarter-period (by quadrant 34), however, the beam-uniting sector mirror 19 during this interval of time directs radiation only from the measuring path of rays (M) onto the radiation detector 23. Although in the fourth quarter-period, the beam of rays 10 would then be allowed to pass to the measuring path of rays (M), by quadrant 35 however, the sector mirror 19 would not reflect the light from the measuring path of rays (M) onto the detector, but would only allow the light from the comparison path of rays (V) to pass. However, the already described and illustrated arrangement (FIG. 4) offers the advantage over this modification (FIG. 6), that the sample and comparison cells PK and VK, respectively, are not irradiated by the light source any longer than the radiation through the cells is actually utilized. Therefore, the heating of the sample or stimulation of long-duration phosphorescence is reduced by the above described (and illustrated in FIG. 4) form.

Moreover, it is advantageous, if in the intervals of time where only the "characteristic" radiation is "seen" (and a signal is generated thereby) by the radiation detector, the same background is always provided behind the respective ray path seen by the detector, in order that radiation from such background does not supply an uncompensated signal component which is different for the two paths of rays.

For this purpose, when utilizing the modified beam-splitting device of FIG. 6, the reflecting quadrant 34 is preferably made reflecting on its rear (i.e., right-hand in FIG. 1) surface as well as its front surface. Then, the housing area H (FIG. 1) appears as background when detecting the characteristic radiation $V_0$ in the second (comparison) path of rays through the transmitting quadrant 35 during the fourth quarter-period; and exactly the same housing area H appears by reflection from the rear surface of quadrant 34 as background when detecting the characteristic radiation $P_0$ in the first (sample) path during the second quarter-period. In this manner, errors are avoided which could occur because of different background when eliminating the characteristic radiation. In particular, the contribution of the same housing background, H, occurring in the second and fourth quarter-periods is of course compensated in the inverted signal (corresponding generally to FIG. 3), since it appears as a $+H$ component in the fourth quarter-period and as a $-H$ component in the second quarter-period (compare FIG. 3). With such a modified form (FIG. 6) of the sector disk 11', the sample and the comparison sample are not irradiated respectively for only one quarter-period by the radiation source as with the illustrated former example, but rather during one respective half-period; however, an unobjectionable compensation of the background radiation is obtained. Depending on whether sample (and reference) irradiation minimization or background equalization are of particular importance concerning the respective measurement, one or the other solution may be preferable and therefore selected in a particular case.

In the above described arrangements the signal sequence in the four quarter-periods is as follows: $P+P_0$, $P_0$ $V+V_0$, $V_0$. For energy reasons, another signal sequence could be advantageous, namely, $P_0$, $P+P_0$, $V_0$, $V+V_0$. In this signal sequence also, the total radiation ($P+P_0$ and $V+V_0$, respectively,) appear with their corresponding characteristic radiation $P_0$ and $V_0$, respectively, from the same respective path of rays appearing in the two immediately adjacent quarter-periods next to the total radiation periods (i.e., in the same half-period intervals). Only the order has been interchanged: First comes $P_0$ and then $P+P_0$ in first half-period made up of the first pair of adjacent quarter-periods, instead of first $P+P_0$ and then $P_0$ (as is the case with the already described and illustrated form). This modified (not illustrated) form better allows for the fact that, due to the inertia of the radiation detector, the obtained signal forms are not ideal rectangles (i.e., square waves), but rise and fall according to an exponential function; and that furthermore, by the filter effect, the output signal of the demodulator is proportional to the amplitude of the first Fourier component of the signal which is in phase with the polarity of inversion of the demodulator. This Fourier component is proportional to $\int f(\omega t) \sin \omega t \, d(\omega t)$; and with the signal sequence $P_0$, $P+P_0$, $V_0$, $V+V_0$, the higher values of the signal $f(\omega t)$ better coincide with the higher values of sine $\omega t$ than with the opposite signal sequence.

Relative to the prior arrangements mentioned at the very beginning of this specification, a system according to the invention has the further advantage that it is substantially insensitive as to the adjustment of the phase position between the signal (angular position of the sector disks) and the demodulator switching points. With prior arrangements, in case of minor phase errors strong "crosstalk" occurs from one channel (P) to the other (V). As compared therewith, even a large misadjustment of the phase of, for instance 18°, only leads to an error $\Delta E$ in the energy E of the signal in one channel, for instance, the sample channel, such that the relative error of $\Delta E/E = 0.5\%$, as compared to 10% occurring in prior systems. Such an error of the energy distribution, however, with the arrangement according to the invention, operating with optical nulling, does not even cause any measuring error, provided the same percentage from both beams of rays passes into the respective other beam (since at balance both electrical signals are equal anyway).

The beam-splitting device need not comprise a rotating sector mirror. Instead, the beam-splitting device may comprise means for producing two beams of rays originating from the light source, as well as a cyclically operating beam-interrupter for the two paths of rays. In such a system, both paths of rays may be interrupted in phase and with double the operating frequency of the beam-combining device (19) by the beam-interrupter. The beam-interrupter may be, for example, an apertured disk. It may, however, even comprise means for directly modulating the light source emission itself.

The arrangement according to the invention makes it possible, by a simple displacement of the switching points of time of the demodulator 24, for example by a phase displacement of an alternating current voltage controlling the demodulator, to detect also other interesting quantities.

By a displacement of the phase position of the demodulator control voltage by an eighth-period (of the total period, T) towards the right in FIG. 2, the demodulator output signal is $(P+P_0)-(V+V_0)$, and a recording of $$\frac{P+P_0}{V+V_0}$$

is accomplished with increased sensitivity.

By displacing the phase position of the demodulator control voltage by an eighth-period towards the left in FIG. 2, the demodulator output signal becomes proportional to $P_0-V_0$, and the ratio $P_0/V_0$ is recorded by eliminating the light source radiation P and V. This latter measurement can be useful for the measurement of emission spectra, particularly if the emission of the samples under the influence of the light source radiation is to be measured. For example, in this manner with the aid of the known radiation laws, the temperature may be determined which is assumed by the samples under recording conditions. The determination of this temperature is almost impossible in any other way; for example, temperature probes introduced into the sample, such as thermocouple elements, are heated in an uncontrollable (i.e., unknown) manner by the radiation itself, and transmit the heat also in uncontrollable manner from the thin sample layers which have only a small heat capacity. Thus other measurements, in addition the usual relative absorption measurement (P/V), may be performed by the illustrated and other described embodiments of the invention.

What is claimed is:

1. In a double-beam photometric measuring system of the type including a radiation source, a beam-splitting device, whereby a beam of rays originating from said radiation source is directed in cyclic sequence into a first and a second path, a beam-uniting device, whereby the radiation from the first and from the second path is alternatingly directed in cyclic sequence into a common path onto a single radiation detector in such a manner that in two quarter-periods only the characteristic radiation from the first and second paths, respectively, and in two further quarter-periods the radiation from the light source in addition to the characteristic radiation from the first and second paths, respectively, is directed into the common path to the detector, and further including a phase-sensitive demodulator for the signal of the radiation detector, the improvement comprising:

said beam-splitting and said beam-uniting devices (11 and 19, respectively) are of such construction and of such relative operative relationship so as to cause said detector in one half-period to receive during one quarter-period of an entire period total radiation $(P+P_0)$ from said source (P) and characteristic reradiation from elements in said first path $(P_0)$ and during an immediately adjacent another quarter-period only characteristic reradiation from said first path elements $(P_0)$; and said detector in the other half-period to receive during one quarter-period of the entire period total radiation $(V+V_0)$ from said second path including both transmitted radiation from said source (V) and characteristic reradiation from elements in said second path $(V_0)$, and during an immediately adjacent another quarter-period only characteristic reradiation from said second path elements $(V_0)$, each of said two adjacent total and characteristic reradiation quarter-periods in each half-period occurring in the same relative order;

said phase-sensitive demodulator (24) being of such construction and of such relative phasing as to cause a relative inversion of the output signals of said detector at a single frequency equivalent to one half-period, normally phased to cause the relative inversion switching to occur first substantially between the first and second quarter-periods and then substantially between the third and the fourth quarter-periods, so that relative inversion occurs between each adjacent quarter-period of each half-period so as to cause substantial subtraction of substantially equal components of characteristic radiation for each of said first and second paths ($\frac{1}{2}P_0-\frac{1}{2}P_0$ and $\frac{1}{2}V_0-\frac{1}{2}V_0$, respectively), as well as substantial inversion and therefore subtraction of the entire transmitted radiation from said source by said first and said second path $(P-V)$;

whereby the D.C. demodulated final signal is directly proportional to the difference in the transmitted radiation from the source by said first and second paths $(P-V)$ substantially free from characteristic reradiation $(P_0, V_0)$;

and an attenuator nulling means (27) operatively driven by said D.C. demodulated final signal to attenuate the radiation in said second path of radiation (V), so as to cause said final difference signal $(P-V)$ to be nulled to zero.

2. A double-beam photometric system according to claim 1, in which:

said beam-splitting device (11) and said beam-uniting device (19) comprise elements operatively driven at the same frequency;

said beam-splitting and said beam-uniting devices however being of such construction and of such relative phasing as to cause beam switching at a relative phase difference of one quarter-period.

3. A double-beam photometric system according to claim 2, in which:

said beam-splitting device comprises interrupting means for blocking source radiation from each said first and second paths during those two quarter periods said beam-uniting device is not directing source-originating radiation from that particular one of said first and second path to said common path to said detector;

whereby unnecessary heating and other radiation-caused effects of the various elements in said first and said second paths is minimized.

4. A double-beam photometric system according to claim 2, in which:

each of said beam-splitting and said beam-uniting devices comprise at least one sector plane mirror each, rotating at the same speed, and are so positioned so as to enter into said paths with their respective planes along the angle bisector of the respective transmitted and reflected beams;

said mirror sectors of said beam-splitting and said beam-uniting devices being respectively offset to each other by a rotation angle of 90°, so as to enter said beams at a relative phase difference of one quarter-period.

5. A double-beam photometric system according to claim 2, in which:
   said beam-splitting device comprises two diametrically opposed opaque absorbing blackened quadrants (14, 15) between which are positioned a reflecting sector mirror (13) and a transmitting quadrant (12);
   whereby during sequential quarter-periods, radiation is transmitted, absorbed, reflected, and then absorbed again by said beam-splitting device, said transmitting and reflecting quarter-periods being those in which source radiation is passed into one of said two paths and ultimately to said common path to said detector.

6. A double-beam photometric system according to claim 2, in which:
   said beam-splitting device comprises a substantially semi-circular reflecting sector mirror (13', 34) and a transmitting substantially semi-circular sector (12', 35);
   at least that reflecting quadrant (34) which is caused to be seen by said detector by a reflecting portion (20) of said beam-uniting device being also reflecting on its rear surface as well.

7. A double-beam photometric system according to claim 1, in which:
   said phase-sensitive demodulator is phase adjustable so as to cause relative retardation and advancement of its inversion switching by an amount equal to substantially one-eighth of a period;
   whereby relative measurements of total radiation, that is, both transmitted source radiation plus characteristic radiation, in each of said first and second paths; and relative measurements of characteristic radiation only in each of said first and second paths may also be made.

8. A double-beam photometric system according to claim 1, in which:
   said beam-splitting device comprises means for producing two beams from said source and means for cyclically interrupting both said beams in phase with said beam-uniting device.

9. A double-beam photometric system according to claim 8, in which:
   said cyclically interrupting means is of such construction, relative frequency and phase relative to said beam-uniting means as to cause interruption of said beams at a frequency double that of said beam-uniting switching frequency, but in phase therewith.

10. A double-beam photometric system according to claim 9, in which:
    said cyclically interrupting means comprises means for modulating the emission of said source.

References Cited
UNITED STATES PATENTS 2,678,581   5/1954   Reisner.

RONALD L. WIBERT, Primary Examiner

O. B. CHEW II, Assistant Examiner

U.S. Cl. X.R.

250—204